United States Patent Office 2,786,758
Patented Mar. 26, 1957

2,786,758

METHOD OF PREPARING SILICEOUS PIGMENT AND METHOD OF PREPARING PAPER FROM SUCH PIGMENT

Louis B. Taylor, Pittsburgh, Pa., assignor to Columbia-Southern Chemical Corporation, Allegheny County, Pa., a corporation of Delaware No Drawing. Application August 26, 1954, Serial No. 452,458

17 Claims. (Cl. 92—21)

This invention relates to a novel method for producing particularly valuable types of siliceous pigment, which pigment may be used in various fields, notably as a pigmenting agent in the manufacture of paper. According to the present invention, a particularly useful pigment has been prepared by reaction of an alkaline earth metal silicate, notably calcium silicate, with aluminum sulfate in an aqueous medium initially containing an alkaline earth metal sulfate such as calcium sulfate.

In most cases, the pigment provided by recourse to the present invention has the composition corresponding substantially to the following formula on the water-free basis:

$$Al_2O_3 \cdot bCaO \cdot cSO_3 \cdot axSiO_2$$

where $x$ is a number from about 1 to about 4, $a$ is a number ranging from about 3 to about 6, $b$ is a number not greater than $a$ and ranging from 1.5 to 6, and $c$ is not greater than $b$ and is the range of from about 1.5 to 3. The symbols $a$, $b$, $c$, and $x$ include whole and fractional numbers. This pigment is useful in the reinforcement of rubber, as a filler or pigment for paper compositions, and as a paint or an ink pigment. It also may be used as a loading or diluting agent in compounding insecticides such as benzene hexachloride or DDT.

In accordance with the present invention, it has been discovered that these valuable pigments may be effectively prepared by reaction of finely divided calcium silicate with aluminum sulfate in an aqueous medium initially containing calcium sulfate. By recourse to finely divided calcium silicate and an aqueous medium initially containing calcium sulfate, an especially effective process for manufacturing this material is provided. That is, when aluminum salts are commonly added to sodium silicate solutions, the product which is obtained upon drying the resulting precipitate usually is hard and glassy. In contrast, the product produced by reaction of aluminum sulfate with finely divided calcium silicate or like alkaline earth metal silicate in an aqueous medium initially containing calcium sulfate is in the form of a light pulverulent powder having an average ultimate particle size below 0.1 micron, usually as low as 0.02 to 0.05 micron. This product also usually contains some quantity of water of hydration.

Two types of water normally are present, i. e. "free water" and "bound water." The term "free water" as used in this specification, denotes the water which may be removed from the pigment by heating the pigment at a temperature of 105° C. for a period of 25 hours. The term "bound water," as used herein, is intended to mean the amount of water which is driven off from the pigment herein manufactured by heating the pigment at ignition temperature, for example, 1000° C. to 1200° C., until no further water can be removed, minus the amount of the free water in the pigment. Thus, it appears that the bound water is chemically bound to the pigment in some way not clearly understood. The free water, on the other hand, is readily removed and apparently is simply absorbed on the pigment.

The free water concentration in the pigment normally ranges from about 2 to 10 percent by weight. Bound water which is present normally ranges between 2 to 10 percent by weight, more usually being in the range of about 1 mole per 2 moles of $SiO_2$.

Various types of calcium silicate may be reacted with aluminum sulfate in an aqueous medium initially containing calcium sulfate according to the present invention. Thus, naturally occurring calcium metasilicate such as wollastonite which is a calcium silicate containing one mole of $SiO_2$ per mole of CaO, may be subjected to treatment according to the instant invention. Best results are obtained when precipitated calcium silicate is so treated. In such a case, the calcium silicate should have an average particle size below 1 micron and, to obtain a pigment having the best properties, it is preferred to treat calcium silicate having an average particle size below 0.1 micron as determined by the electron microscope.

The method of preparing the calcium silicate determines many of the properties thereof, and in the like manner, determines properties of the pigment prepared according to this invention. Thus, it is advantageous to describe a method of preparing calcium silicate which has been found especially advantageous for use in connection with the present invention. Such calcium silicate may be prepared by reacting calcium chloride with alkaline earth metal silicate in an aqueous medium containing an initial amount of sodium chloride or like metal chloride. This sodium chloride conveniently may be in the calcium chloride solution although it may also be in the sodium silicate solution. Thus, it has been found desirable to react aqueous sodium silicate with an aqueous calcium chloride solution containing sodium chloride, preferably in the proportion of at least 0.1 pound, and usually in the range of 0.2 to 0.5 pound of sodium chloride per pound of calcium chloride. Normally, the sodium chloride content of the solution is in excess of 2 to 5 grams per liter. However, solutions which contain higher sodium chloride contents, may be employed. Although it is rare that the weight of sodium chloride will exceed the weight of calcium chloride in the solution or will be present in excess of 100 grams per liter in either solution, the presence of sodium chloride materially improves the character of the calcium silicate for use in the practice of the process comprising this invention.

For most purposes, calcium chloride solutions containing in excess of 20 grams of calcium chloride per liter, usually in the range of 50 to 150 grams per liter, and sodium silicate solutions containing in excess of 20 grams of $SiO_2$ per liter, usually in the range of 50 to 150 grams per liter of $SiO_2$, are used. More concentrated solutions, containing up to about 200 grams per liter of calcium chloride and of $SiO_2$ or even higher, may be used, although best results have been obtained when the concentration of the calcium chloride and $SiO_2$ solutions is below 200 grams per liter. Also, more dilute solutions may be used.

The proportion of calcium chloride solutions to sodium silicate normally is sufficient to react with all or at least most of the sodium silicate. In general, the amount of calcium chloride is in stoichiometric excess. However, small excesses of sodium silicate are not objectionable. Thus, it is possible to use sodium silicate 10 to 25 percent in excess of the calcium chloride although best results are obtained when the calcium chloride is at least in stoichiometric amounts. Excesses of sodium silicate as high as 100 percent over stoichiometric usually give unsatisfactory products. However, even such amounts may be used if the sodium chloride concentration is sufficiently high and the rate of acidification held within proper limits.

Thus, the adverse effects of excess sodium silicate may be counteracted to an appreciable degree by the presence of sodium chloride in the reaction mixture subjected to acidification.

The precipitation of the calcium silicate in a finely divided state, such as is herein contemplated, may be accomplished by mixing a stream of aqueous sodium silicate solution with the calcium chloride solution under conditions which subject the mixture to a high degree of turbulence and almost instantaneous mixing. One effective way to produce the required turbulence is to introduce the two streams closely together into a central area of a centrifugal pump. In this case, the agitation of the mixture is effected as the introduced streams of the reactants are thrown radially outward by the pump rotor. In most cases, it is found desirable to limit the feed of the calcium chloride solution and alkaline metal silicate solutions to the pump to an amount below the capacity of the pump. For example, if the pump is capable of discharging 100 gallons per minute with unlimited flow of liquid to the pump, the amount of reacting solution supplied to the pump is held at least 10 percent below, and usually 35 percent or more below this amount. This appears to afford a greater degree of agitation of the reacting solutions and to ensure production of calcium silicate having the desired fineness.

To ensure production of the calcium silicate in a highly finely divided state, alkaline metal silicate having the composition $Na_2O(SiO_2)_x$, where $x$ is a number not less than 2 nor more than 4, is preferably used. This results in the production of a calcium silicate having the composition $CaO(SiO_2)_x$, where $x$ is as defined above. However, other sodium silicates, wherein $x$ is higher, may be used in certain cases.

Calcium silicate prepared according to the above method has an average ultimate particle size of about 0.015 to 0.04 micron and a surface area of about 50 to 100 square meters per gram. Its composition is $CaO \cdot (SiO_2)_x$ where $x$ ranges from 2 to 4. This calcium silicate produces a fine, high quality product when used in the process of this invention. It should however be understood that other methods of preparing calcium silicate of equivalent quality may be employed to provide suitable calcium silicate for the practice of this invention.

Following precipitation or other recovery of the calcium silicate, it is reacted with aluminum sulfate in an aqueous medium initially containing calcium sulfate. If desired, the aluminum sulfate may be added to the precipitated slurry of calcium silicate either before or after removal of alkali metal salts from the slurry but subsequent to the provision of a small quantity of calcium sulfate in the slurry.

Alternatively, the calcium silicate may be separated from the aqueous slurry in which it has been formed and dried at a convenient temperature, for example, by heating at 100° to 150° C. Usually, such drying is conducted by heating at approximately 125° C. The dried pigment may then be reslurried in aqueous medium containing calcium sulfate and thereafter reacted with aluminum sulfate.

The reaction may be conducted by adding aluminum sulfate, usually as an aqueous solution, to an aqueous slurry of calcium silicate. Either, or both, aqueous media may contain calcium sulfate. When but one of the two aqueous media contains calcium sulfate, allowance is made for the dilution effects when the two are mixed such that the resulting aqueous media contains adequate calcium sulfate. When the aluminum sulfate is added to a slurry of calcium silicate, and the presence of the calcium sulfate is provided, the alkalinity of the pool of the calcium silicate gradually falls from a pH of about 10 to below about 8.5, usually in the range of 6 to 8.5, depending upon the desired degree of completion of the reaction between the aluminum sulfate and calcium silicate. Further addition of aluminum sulfate solution causes an additional drop in pH. However, the reaction is essentially complete at pH 6.

According to a further method, the calcium silicate slurry may be added to a pool of aluminum sulfate solution containing calcium sulfate. In this case, the pH of the slurry rises from about 3, and again complete consumption of the aluminum sulfate is effected at about pH 6. Further addition produces a mixed slurry containing free calcium silicate which may react further, forming a calcium aluminum silicate. Addition of calcium silicate slurry is discontinued before the pH of the slurry rises above 8.5, usually in the range of 4 to 8.5.

According to a further embodiment, flowing streams of the aluminum sulfate solution and calcium silicate slurry may be mixed together, for example, in a centrifugal pump, while proportioning the reactants so that the slurry produced has a pH of about 4 to 8.5 and ensuring the presence of calcium sulfate by its inclusion in either or both of the respective streams.

The resulting dried product is a fine, soft, freely-flowing powder which is relatively light in density. In general, it has a surface area of about 25 to 200 square meters per gram measured by the Brunauer-Emmett-Teller method which is described in Jour. Am. Chem. Soc., volume 60, page 309 (1938). Unless contaminated with coloring impurities, the product has unusual whiteness and has good hiding power.

As has already been pointed out, the reaction of the present invention is conducted in the presence of a media initially containing calcium sulfate, or like alkaline earth metal sulfate. In general, it is preferable to provide for the presence of an alkaline earth metal sulfate corresponding to the alkaline metal silicate. Thus, when calcium silicate is employed, the aqueous media should contain calcium sulfate.

Before reaction of calcium silicate and aluminum sulfate commences, the aqueous media in which the reaction is to be conducted should contain a calcium sulfate concentration equivalent to between about 5 or 10 and 75 or 100 percent of the solubility of calcium sulfate in water at the reaction temperatures. Thus, preferably between 0.17 or about 0.2 and about 2.0 grams of calcium sulfate per liter is present. Somewhat more than 2.0 grams per liter of calcium sulfate may also be employed, particularly when the reaction is conducted at temperatures below 20° C. As low as about 0.1 gram per liter may be employed, particularly when temperatures on the order of above 50° C. are used. The calcium sulfate concentration is present during the entire reaction, and even may slightly increase as the reaction progresses.

In establishing an adequate initial calcium sulfate concentration in the aqueous media prior to commencing the reaction of calcium silicate and aluminum sulfate, the dilution effect caused by adding aqueous solutions or slurries of the reagents should be taken into account. Thus, in adding an aqueous solution of aluminum sulfate to a slurry of calcium silicate, the quantity of calcium sulfate provided in the calcium silicate slurry should be adequate to provide the hereinbefore defined initial calcium sulfate concentrations even after dilution by the addition of a aluminumm sulfate solution. When the aluminum sulfate solution also contains an appropriate quantity of calcium sulfate, no dilution effect is encountered.

In a further embodiment of this invention, finely divided solid calcium silicate and aluminum sulfate are added to an aqueous body containing the requisite concentration of the calcium sulfate while the liquid body is subjected to agitation such as is provided by stirring. The reagents, in this procedure, may be added simultaneously or sequentially. However, it is preferred to first add the finely divided calcium silicate to the aqueous media which is subjected to good agitation and subsequently add the appropriate quantity of aluminum sulfate.

It will be understood that the reaction between the aluminum sulfate and the calcium silicate occurs substantially in accordance with the following equation:

$$3CaO \cdot (SiO_2)_x + Al_2(SO_4)_3 \rightarrow Al_2O_3 \cdot 3CaO \cdot 3SO_3 \cdot 3xSiO_2$$

From the above equation, it will be seen that one mole of aluminum sulfate reacts with 3 moles of calcium silicate. Where this stoichiometric proportion of aluminum sulfate to calcium silicate is employed, all or substantially all of the calcium silicate is decomposed and only a minor amount of unreacted calcium silicate remains.

Since calcium sulfate has a substantial water solubility, an appreciable amount of the CaO and $SO_3$ content of the pigment frequently is extracted on filtration or settling of the pigment. This is particularly true when the calcium sulfate concentration is in the lower portion of the hereinbefore range, e. g. when the initial calcium sulfate concentration is below about 1.0 gram per liter. Also, when the pigment is water washed such extraction may occur. Thus, the CaO and $SO_3$ content of the completely reacted product usually is less than 3 moles per mole of $Al_2O_3$, although generally higher than about 0.5 mole per mole of $Al_2O_3$.

Where all of the calcium silicate is reacted, the subscript $a$ in the first above formula is substantially 3. When only 50 percent of the calcium silicate is reacted, the subscript $a$ is 6, and by reacting a substantial amount of calcium silicate, i. e. about 25 percent of the silicate, the subscript is 12.

Calcium silicate and like alkaline earth metal silicates are highly alkaline. A slurry of precipitated calcium silicate having the composition $CaO(SiO_2)_{3.3}$ has a pH of about 10.5.

In many cases it is found desirable to effect precipitation or formation of the herein contemplated reaction product of aluminum sulfate and calcium silicate in situ in a fibrous mixture. Thus, according to another preferred embodiment of this invention, a paper of high whiteness and brightness may be prepared by adding to a slurry of paper forming fibers a quantity of aluminum sulfate and, after the aluminum sulfate solution has permeated the pores of the slurry, as by simple mixing or conventional beating technique, adding thereto a quantity of calcium silicate such as set forth above. The requisite quantity of calcium sulfate initially present in the slurry of paper forming fibers may be provided by incorporating an appropriate quantity of calcium sulfate therein directly or calcium sulfate may be included in the added aluminum sulfate solution. The resulting mixture is usually thoroughly mixed in a conventional beater to incorporate the coprecipitated pigment thoroughly and to effect a good bond between the surface of the fiber and the pigment.

This method of precipitating the pigment in situ may be applied to various other materials, including cotton cloth and the like. The products which are obtained by this precipitation in situ with fibrous materials have the whiteness and brightness of fibrous stocks in which titanium dioxide has been incorporated and are much cheaper to produce.

Paper compositions prepared in accordance with this process are of particular value and accordingly a further preferred embodiment of this invention involves the precipitation of the pigment and incorporation thereof in paper stock. Several alternative procedures are applicable in this regard. Thus, the process herein described may be employed to provide the desired pigments, and then, before or after drying, the pigment may be incorporated with the fiber in a conventional pulp beater and therein beaten into the pulp. Thereafter the pulp is sheeted out into paper. However, it is more advantageous to conduct the reaction comprising this invention in the presence of a fibrous mixture of paper forming materials. Preferably, an aqueous media containing the fibrous materials and calcium sulfate is established, usually in the beater. Thereafter, the reactants may be added, either simultaneously or sequentially.

A particularly advantageous mode of addition in this regard includes the initial formation of an aqueous media of the fibrous paper forming material containing the calcium sulfate. To this, is added a finely divided calcium silicate having an average particle size below 0.1 micron, usually as low as 0.02 to 0.05 micron, and having a surface area of about 25 to 200 square meters per gram. The resulting mixture is then subjected to good agitation, as may be provided in a conventional beater. This agitation may be for a considerable time period, but usually is restricted to between 15 minutes and 5 hours. Thereafter, the aluminum sulfate is added and, preferably in the presence of continued agitation, the desired reaction takes place.

The paper stock so prepared contains from about ½ to 10 percent, more usually between 3 and 6 percent, fibers by weight on a dry fiber basis. Sufficient calcium silicate is employed to provide about 0.5 to about 20 percent $SiO_2$ based on the weight of fiber in the pulp. Such a beater pulp slurry is thereafter conducted to a paper forming operation such as is provided by a Fourdrinier or cylinder machine. In such operation, the fibrous contents of the slurry along with the pigment is formed into sheets with substantially all of the liquid being withdrawn through the paper-making screen as tray or white waters. The sheeted material is then conducted to a press operation and thereafter dried according to typical paper making procedures. A retention on the paper of between 70 to 90 percent of the pigment present in the beater is achieved.

Once, the beater pulp slurry is provided with the appropriate calcium sulfate concentration, at least a portion of the tray or white waters obtained during the sheeting operation may be recycled to provide the aqueous medium for subsequent beater pulps without the addition of other calcium sulfate. Often, even when some dilution of white waters occurs in the beater pulp slurry sufficient calcium sulfate is present such that no additional quantities are required. Apparently, these white waters contain the necessary calcium sulfate once the initial conditions in the beater have been established. Thus, according to the present invention, a cyclic process for preparing paper may be provided by recycling the white waters to the beater operation, wherein requisite quantities of pulp, calcium silicate and aluminum sulfate are added.

Also present in the white water are the more finely divided pulp materials, fibrils, which pass through the screen in the paper forming operation. Presence of fibrils or fines in the recycled media in which the pigment is precipitated in situ has been found to be advantageous. For one thing, an enhanced efficiency with respect to the quantity of pulp employed is obtained.

The various other paper making operations may be included. Thus, either sized or unsized paper may be prepared. If sized paper is desired, a rosin size such as a soluble alkaline metal rosin soap (sodium resinate) or other typical sizes, may be mixed with the pulp slurry and precipitant for the size added thereto, concurrently or prior to the addition of the calcium silicate. Precipitants are compounds of a trivalent or tetravalent metal, such as titanic sulfate and aluminum sulfate, the latter being the most notable. In addition to the use of size, coloring matter also may be incorporated during the beating cycle.

If desired, the pulp may be bleached prior to its formation into paper. For example, an aqueous slurry of brown wood fibers and chemical fibers may be bleached by the addition of chlorine in an oxidizing form and used as chlorine gas and a sodium hypochloride or calcium hypochloride. This bleaching may be conducted in conjunction with the preparation of the paper forming compositions. Usually it is accomplished prior to the pigmentation of the fibrous paper pulp.

After calendering and suitably drying the paper formed on the Fourdrinier or cylinder machine it is also possible to apply a desirable coating. Typical of the coatings is clay, usually in a finely divided state, which is bonded to the sheet by an adhesive such as starch. This coating is usually applied to obtain improved smoothness and gloss of the paper product, which qualities are important, for example, in paper on which photographs are to be printed. Another type of coating agent which is employed is a finely divided, precipitated, hydrated silica. An adhesive is unnecessary in such silica.

Paper which is produced in accordance with the present process and having pigment loadings of from about 0.5 to 30 percent by weight or even higher have been found to have particularly high brightness, opacity, and smoothness. Bursting and tear strength in paper sheetings so prepared are quite satisfactory and often tear strength exceeds that of a non-pigmented paper.

It will be understood that all types of paper pulp are susceptible to use in the present invention. Thus, chemically treated pulps typified by sulfite, soda or kraft pulp, semi-chemical pulp or mechanically ground pulp, or mixtures are suitable. Besides virgin pulp, the pulp slurry may include broke, i. e. cuttings or scraps of paper recovered from paper making operations.

The following examples are illustrative:

Example I

A water slurry containing 10 pounds of finely divided calcium silicate having an average ultimate particle size of about 0.05 micron as determined by the electron microscope, and having the composition $CaO \cdot (SiO_2)_{3.36}$, is thoroughly mixed with an aqueous solution containing 4.44 pounds of aluminum sulfate in an agitated tank. Prior to the mixing, sufficient calcium sulfate is added to the calcium silicate slurry to provide 0.5 gram of calcium sulfate per liter of water in the mixed medium. After thoroughly mixing, the slurry is filtered and dried in a tray-type dryer at a temperature of 100 to 125° C. The thusly prepared silicate is a very fine white powder.

Example II

An aqueous slurry containing 100 grams per liter of finely divided calcium silicate having the composition $CaO(SiO_2)_{3.3}$ is prepared by mixing continuously flowing streams of sodium silicate and calcium chloride, each containing 100 grams per liter of reactant, in a pump as described above. To the slurry is added 0.4 gram per liter of calcium sulfate and the resulting slurry is titrated with an aqueous solution containing 10 percent by weight of aluminum sulfate to a greenish yellow color using bromothymol blue as the indicator. The pH of such a slurry is about 7. During the titration, the temperature is maintained at 180° F. and the mixture was thoroughly agitated. Thereafter, the resulting product was filtered, washed with hot water, and dried at a temperature of about 100–125° C. The dry product was then milled providing a product which is a fine, very white powder which, upon dispersion in water, gives a slurry having a pH of about 5.7.

Example III

Duplicating the process of Example II, except that 1.5 grams per liter of calcium sulfate is present in the slurry prior to titration and effecting titration at 75° F. results in a product when dispersed in water, gives a slurry having a pH of 7.

Example IV

A pulp beater is charged as follows:

| | Grams |
|---|---|
| Unbleached sulfite pulp | 90 |
| Bleached kraft pulp | 180 |
| Hard white envelope cuttings | 90 |

This charge is dispersed in 23 liters of water and the resulting slurry is beaten in a Niagara beater for about 80 minutes to approximately 400 milliliters freeness (Canadian Standard). (TAPPI Standard T227M50.)

One hundred milliliters of prepared rosin size solution containing about 5 percent by weight of size is then added. Thereafter, 9 grams of pre-gelatinated starch is added and the pulp is circulated in the beater long enough to ensure complete mixing. Three percent by weight, based upon the weight of the pulp on a dry basis of aluminum sulfate is added to samples of this pulp containing 18.8 grams of the pulp on a dry basis. At this stage, the pulp consistency of each sample is approximately 1.1 percent. Stirring is continued for 2 minutes. Then, 7 grams of calcium sulfate are added. Immediately thereafter, calcium silicate (prepared by the continuous process described above and dried at about 100–130° C.) having an average ultimate particle size of about 0.03 micron and the composition $CaO(SiO_2)_{3.3}$ is added. Stirring of the mixture is continued for 10 minutes after the addition of calcium silicate and the resulting stock is diluted to 800 milliliters with water and sheeted into paper. The paper so produced possesses highly acceptable brightness and opacity as well as adequate burst and strength.

Example V

One thousand pounds of bleached kraft pulp and 1000 pounds of bleached sulfite pulp are slurried in roughly 6000 gallons of water. The pulp was agitated after which it is beaten in a stainless steel Jones beater at 3000 per square inch pressure for 90 minutes. Twenty-four pounds of rosin size in an aqueous solution is then added to the beater along with 26 fluid ounces (equivalent to 13 ounces of dry coloring agent) of ultramarine blue, a coloring agent. Fifty-one gallons of iron-free aluminum sulfate solution containing 3.5 pounds of $Al_2(SO_4)_3.18H_2O$ per gallon is added to the beater one-half hour before the end of the beating cycle. Sufficient calcium sulfate to establish a concentration of 1.1 grams per liter thereof in the beater slurry is added. In a separate tank 120 pounds of finely divided calcium silicate prepared by the reaction of sodium silicate with excess calcium chloride as described above is slurried with 500 pounds of broke and about 1000 gallons of water and agitated for one hour. This slurry and the pulp are then mixed in a stock chest. The stock thus formed, which has a solids content from about 4 to 5 percent, is pumped through a refiner and head box to a Fourdinier machine. Free water containing small amounts of pigment and pulp are sucked through the wires leaving a paper sheet which is then dried and tub sized.

Paper sheets produced in accordance with the process outlined in Example V have high brightness and opacity of satisfactory strength.

Example VI

Some 600 pounds of rag fiber, 600 of bleached kraft pulp, and 1000 pounds of bleached sulfite pulp, 100 pounds of titanium dioxide, 32 pounds of rosin size in aqueous solution and about 6000 gallons of water are charged to a beater where the mixture is beaten for about 90 minutes. Sixteen fluid ounces of blue dye solution, 6 ounces of red dye solution, and 45 gallons of iron-free aluminum sulfate solution containing 3.5 pounds of $$Al_2(SO_4)_3.18H_2O$$

per gallon are dumped into the beater 15 minutes before the conclusion of the beating cycle. Meanwhile, 200 pounds of finely-divided calcium silicate prepared by the reaction of sodium silicate with excess calcium chloride is placed in a Hydrapulper together with 1200 pounds of broke consisting of scrap paper pigmented with titanium dioxide and about 2000 gallons of water and agitated for an hour. The hydrapulped slurry is mixed with sufficient calcium sulfate to provide 0.8 gram per liter in the slurry resulting after mixing with two beater loads of pulp. Then, the contents of the Hydrapulper are mixed with the two beater loads of pulp in a stock chest, pumped through a refined and head box to a Fourdrinier machine, where paper sheet was formed.

*Example VII*

Four hundred grams of oven-dry sulfite paper pulp is mixed with 20 liters of water and the resulting mixture is beaten in a laboratory pulp beater for 10 minutes. Then, 8 grams of dry rosin size is added and beating was continued until the pulp had a freeness of 175 cc. Ten minutes before the beating is completed, 16 grams of paper makers' alum is added. Following further beating, and the addition of 10 grams of calcium sulfate to the mixture, 8 grams of calcium silicate having the CaO to SiO2 ratio of about 1 to 3.3, an average particle size of 0.3 micron, and containing about 6 percent bound water and 6 percent free water is added and the mixture circulated for several minutes. After this, the charge is removed from the beater.

Two liters of the charge is diluted with a portion of the white water obtained by filtering the remaining charge to a consistency necessary for paper making and the pulp is settled to make paper.

The white water obtained during the above paper making operation is then mixed with 400 grams of oven-dried sulfite paper pulp. The white water is employed in lieu of the 20 liters of water used in the foregoing description. Thereafter, following the exact procedure, except omitting the addition of calcium sulfate, paper is formed. This use of white water obtained from a prior paper making operation conducted under condition in which the appropriate quantity of calcium sulfate were present during the course of the aluminum sulfate and calcium silicate reaction provides the necessary media initially containing calcium sulfate in which the reaction is conducted.

Replacement of a portion of the aluminum sulfate requirements with sulfuric acid in conducting the reaction of forming a pigment particularly in situ with paper forming materials is within the contemplation of this invention. Often, by such a replacement a paper of further improved brightness, equivalent opacity, and only slightly decreased bursting strength is obtained. Inasmuch as sulfuric acid is cheaper than aluminum sulfate, the partial replacement, usually comprising less than one-third of the aluminum sulfate normally used, with sulfuric acid has several desirable features. Other sulfur-oxygen containing acids, notably sulfuric acid including its anhydride $SO_2$, may be used with similar results.

*Example VIII*

Three hundred and eighty-five grams of kraft pulp is slurried in 23 liters of water and beaten for 3 hours in a Niagara beater at 6500 grams bar load. Thereafter 1400 grams of pulp slurry is diluted to 5900 grams and 16.8 cubic centimeters of an aluminum sulfate solution containing 5 percent aluminum sulfate by weight (corresponds to four percent aluminum sulfate based on the dry weight of the slurry) are added and stirred for five minutes. Twenty-three grams of calcium sulfate is also added.

To this pulp mixture is added a slurry containing 1.05 grams of dried, precipitated calcium silicate, $$CaO(SiO_2)_{3.3}$$

or about 5 percent by weight of the pulp on a dry basis in 400 milliliters of water. The mixture is then stirred for five minutes.

The resulting pulp slurry is then formed into paper sheets.

This procedure is repeated while partially replacing aluminum sulfate by a one percent sulfuric acid solution to form pulp from which high grade paper is made. Thus, each reagent in each run is as follows:

| Run | Cubic Centimeters of 5% $Al_2(SO_4)_3.18H_2O$ | Cubic Centimeters of 1% $H_2SO_4$ |
|---|---|---|
| 1 | 16.8 | None |
| 2 | 12.6 | 7 |
| 3 | 8.4 | 14 |
| 4 | 4.2 | 21 |

The above description has been directed primarily to embodiments of the invention wherein the calcium silicate is prepared by continuous mixing of flowing streams of sodium silicate and calcium chloride, and the calcium silicate has the composition $CaO(SiO_2)_x$, where $x$ is about 2 to 4. Unusually good results have been obtained using such calcium silicate. However, calcium silicate somewhat lower in surface area produced by a batch process in which the sodium silicate is added to a pool of calcium chloride solution or vice versa also may be used with success. Moreover, other water insoluble white calcium silicates including mixed silicates of calcium and other metals may be used, particularly when the silicates have an average ultimate particle size below about 1 micron, preferably below 0.1 micron. Such silicates include calcium aluminum silicate, calcium sodium aluminum silicates, calcium potassium aluminum silicate, calcium zinc silicate, and like silicates in which the mole ratio of total $SiO_2$ to the total CaO in the product is not substantially greater than about 10. A typical mixed silicate of this type which recently has become available has the following composition:

Percent by weight
Ignition Loss at 1000° C _____ 16.7
Loss on drying at 105° C _____ 5.4
$SiO_2$ _____ 46.1
$R_2O_3$ (almost entirely $Al_2O_3$) _____ 10.88
$Fe_2O_3$ _____ 0.24
CaO _____ 11.82
MgO _____ 0.38
$Na_2O$ _____ 10.04
Chloride _____ 0.04
$SO_3$ _____ 3.8
$CO_2$ _____ 6.6

Some portion of the CaO content of this product appears to be present as calcium carbonate.

In addition, calcium silicate or other alkaline earth metal silicates or mixed silicates having about 30 to 100 square meters per gram are particularly valuable as pigmenting agents for paper. Those silicates which are in the form of flocs are notable in this regard, particularly with floc sizes on the order of 1 micron. Such flocs resemble clusters of grapes under the electron microscope and appear to be an agglomeration of ultimate particles of a calcium silicate. The average ultimate particle size usually ranges between about 0.15 and 0.04 microns.

While the above processes have been described in connection with calcium silicate, other corresponding water insoluble alkaline earth metal silicates including barium silicate, magnesium silicate, strontium silicate, etc., may be used in lieu of calcium silicate. Moreover, zinc silicate and like silicates of metals of series 3 to 8 of group II of the periodic table which contain an amount of the oxide of such metal molecularly equivalent to the above stated amounts of CaO may be employed. In such a case, the product resulting from its process has the composition:

$$Al_2O_3 \cdot bMO \cdot cSO_3axSiO_2$$

In lieu of calcium sulfate, other alkaline earth sulfates may be employed to establish the aqueous media initially containing a suitable sulfate concentration in which to conduct the reaction of an alkaline earth metal silicate and aluminum sulfate. Such sulfates include magnesium sulfate, strontium sulfate, and barium sulfate. For the most part, the alkaline earth sulfate corresponding to the alkaline earth metal silicates subjected to reaction with the aluminum sulfate is used, although this is not absolutely essential. Other sulfates corresponding to those of metals of series 3 to 8 of group II of the periodic table may be used particularly in conjunction with the corresponding silicates, e. g. zinc silicate and zinc sulfate.

Sufficient sulfate should be present in the reaction medium at the commencement of the contemplated reaction such that the concentration is equivalent to at least about 5 percent of the sulfate solubility in water at the reaction temperature. More particularly, the sulfate concentration should range from 10 to 75 percent of the sulfate solubility, but even higher concentrations, e. g. 100 percent of solubility, are used.

The pigment prepared according to the present invention may be used for a plurality of purposes. For example, it may be incorporated in printing ink, face powders, tooth paste, insecticidal compositions, and the like. Furthermore, the contemplated products also are found to be especially useful as rubber pigments, particularly for the reinforcement or rubber compositions including both natural rubber and synthetic rubber compositions, such as the butadiene-styrene copolymers known as "GR-S" rubber, chloroprene rubber, butyl rubber, and other like rubber-like polymers of butadiene-1,3, isoprene, piperylene, 2,3-dimethyl butadiene, and chlorobutadiene, including the homopolymers thereof and their copolymers with other organic monomeric ethylenic compounds, such as acrylonitrile, isobutylene, styrene, vinyl chloride, methyl methacrylate, and the like.

It will also be understood that mixtures of the pigment herein contemplated with other pigmentary materials may be produced. For example, calcium silicate may be partially reacted with an amount of hydrochloric acid (or like acid which forms a water soluble calcium salt) sufficient to react with 10 to 50 percent of the calcium silicate and thereby to form a mixture of silica and calcium silicate. The resulting product may then be reacted with aluminum sulfate, in the presence of an aqueous media initially containing calcium silicate to form a co-precipitated mixture of the silica with the pigment herein described. Likewise, other acids which form water soluble salts, such as nitric acid, acetic acid, nitrous acid, and the like, are useful for this purpose. It is also possible to mix the contemplated pigments with calcium carbonate, silica, titanium dioxide, and the like, without co-precipitation.

In addition, other woven, felted, or slurried fibrous materials such as cotton, silk, rayon, linen, synthetic linear polyamides such as nylon, fibers of the polymeric acrylonitrile and acrylonitrile copolymers, Dacron, hemp, sisal, etc., may be incorporated in the aqueous media in which the hereinbefore described reaction of calcium silicate and aluminum sulfate is conducted. This results in the in situ deposition of the prepared pigment in the fibers. Upon sheeting or otherwise preparing fibers, at least a portion of the thusly precipitated pigment will remain in the final product thereby frequently improving the characteristics thereof.

While the present invention has been described with particular reference to the specific details of certain embodiments thereof, it is not intended that such details shall be regarded as limitations upon the scope of the invention except insofar as included in the accompanying claims.

This application is a continuation-in-part of my co-pending applications Serial No. 352,295, filed April 30, 1953, now abandoned, and Serial No. 393,522 filed November 20, 1953.

What is claimed:

1. A method of preparing a composition of matter which comprises reacting a finely divided, water insoluble alkaline earth metal silicate having an average particle size less than 1 micron in an aqueous medium initially containing at least 0.1 gram per liter of calcium sulfate with aluminum sulfate sufficient to react with at least a substantial portion of the water insoluble alkaline earth metal silicate.

2. The method of claim 1 wherein at least sufficient aluminum sulfate is added to react with substantially all of the water insoluble alkaline earth metal silicate.

3. A method of preparing a composition of matter which comprises reacting finely divided, water insoluble calcium silicate in an aqueous medium initially containing at least 0.1 gram per liter of calcium sulfate with an amount of aluminum sulfate sufficient to react with at least a substantial portion of the water insoluble calcium silicate.

4. The method of claim 3 wherein the calcium silicate is finely divided, precipitated calcium silicate having the composition $CaO(SiO_2)_x$, wherein $x$ is a number not less than 2 nor more than 4, and having an average ultimate particle size less than 0.1 micron.

5. The process of claim 3 wherein the calcium silicate contains from 2 to 10 percent by weight of bound water.

6. The process of claim 3 wherein the calcium silicate contains from 2 to 10 percent by weight of bound water and 2 to 10 percent by weight of free water.

7. A method of preparing a composition of matter which comprises reacting aluminum sulfate with a finely divided, water insoluble alkaline earth metal silicate having an average ultimate particle size of less than 0.1 micron in an aqueous medium initially containing at least 0.1 gram per liter of alkaline earth metal sulfate, the aluminum sulfate being in an amount to reduce the pH of the medium below 8.5.

8. A method of preparing a composition of matter which comprises reacting a finely-divided water insoluble alkaline earth metal silicate having an average particle size of less than 0.1 micron in an aqueous medium containing at least 0.1 gram per liter of an alkaline earth metal sulfate corresponding to said silicate with at least sufficient aluminum sulfate to react with a substantial portion of the water insoluble silicate.

9. The method of claim 8 wherein sufficient aluminum sulfate to react with at least one-half of the water insoluble silicate.

10. A method of preparing a composition of matter which comprises reacting finely divided, water insoluble calcium silicate having a particle size of less than 0.1 micron in an aqueous medium initially containing between about 0.1 and 2.0 grams of calcium sulfate per liter with sufficient aluminum sulfate to react with at least a substantial proportion of the water insoluble calcium silicate.

11. The method of claim 10 wherein sufficient aluminum sulfate to react with substantially all of the water insoluble calcium silicate.

12. A method which comprises reacting a water insoluble, finely divided alkaline earth metal silicate in an aqueous media containing fibrous material and initially containing at least 0.1 gram per liter of alkaline earth metal sulfate with sufficient aluminum sulfate to react with at least a substantial portion of the water insoluble silicate.

13. The method of preparing paper which comprises reacting a finely divided water insoluble calcium silicate in an aqueous media initially containing at least about 0.1 gram of calcium sulfate per liter and paper forming pulp with at least sufficient aluminum sulfate to react with substantially all of the water insoluble calcium silicate, and producing paper from the resulting mixture.

14. The method of preparing paper which comprises reacting a finely divided water insoluble calcium silicate in an aqueous pulp medium containing initially at least about 0.1 gram of calcium sulfate per liter with sufficient aluminum sulfate to react with at least a major portion of said water insoluble calcium silicate, forming paper from the resulting pulp slurry with consequent recovery of white waters, establish a further pulp containing aqueous medium containing at least a portion of said white waters and reacting finely divided water insoluble calcium silicate with aluminum sulfate in said further medium.

15. The method of claim 14 wherein the water insoluble calcium silicate is finely divided, precipitated calcium silicate having the composition $CaO(SiO_2)_x$ wherein $x$ is a number not less than 2 nor more than 4 and having an average ultimate particle size less than 0.1 micron.

16. The method of claim 14 wherein the water insoluble calcium silicate is substantially completely reacted with the aluminum sulfate.

17. The method of claim 14 wherein the calcium sulfate concentration in the first medium is between about 0.1 to 2.0 grams per liter.

References Cited in the file of this patent

UNITED STATES PATENTS

| | | |
|---|---|---|
| 105,594 | Pemberton | July 19, 1870 |
| 157,198 | Duemling | Nov. 24, 1874 |
| 764,032 | Bertram et al. | July 5, 1904 |
| 1,868,291 | O'Connor | July 19, 1932 |
| 1,920,340 | Bailey et al. | Aug. 1, 1933 |
| 2,034,519 | Larson | Mar. 17, 1936 |
| 2,204,113 | Allen | June 11, 1940 |
| 2,237,374 | Smith | Apr. 8, 1941 |
| 2,287,700 | Muskat et al. | June 23, 1942 |
| 2,314,188 | Allen | Mar. 16, 1943 |
| 2,315,892 | Booth | Apr. 6, 1943 |

FOREIGN PATENTS

| | | |
|---|---|---|
| 526,674 | Great Britain | Sept. 24, 1940 |